United States Patent
Marino

(10) Patent No.: US 10,797,542 B2
(45) Date of Patent: Oct. 6, 2020

(54) STATOR OF AN ELECTRIC MACHINE PROVIDED WITH FLUID COOLING

(71) Applicant: FERRARI S.p.A., Modena (IT)

(72) Inventor: Luigi Marino, Catania (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 16/217,117

(22) Filed: Dec. 12, 2018

(65) Prior Publication Data
US 2019/0207439 A1    Jul. 4, 2019

(30) Foreign Application Priority Data
Dec. 13, 2017  (IT) .................. 102017000143710

(51) Int. Cl.
| | |
|---|---|
| *H02K 1/20* | (2006.01) |
| *H02K 5/20* | (2006.01) |
| *H02K 9/19* | (2006.01) |
| *H02K 3/50* | (2006.01) |
| *H02K 1/16* | (2006.01) |

(Continued)

(52) U.S. Cl.
CPC .............. *H02K 1/20* (2013.01); *H02K 3/50* (2013.01); *H02K 5/20* (2013.01); *H02K 9/19* (2013.01); *H02K 1/16* (2013.01); *H02K 3/12* (2013.01); *H02K 3/38* (2013.01)

(58) Field of Classification Search
CPC .. H02K 1/20; H02K 9/19; H02K 5/20; H02K 3/50; H02K 3/38; H02K 3/12; H02K 1/16
USPC ..................................... 310/59, 54
See application file for complete search history.

(56) References Cited

U.S. PATENT DOCUMENTS

| | | | | |
|---|---|---|---|---|
| 3,459,979 A | * | 8/1969 | Carew ............... | H02K 3/20 310/54 |
| 5,806,169 A | * | 9/1998 | Trago ............... | H02K 5/08 29/596 |

(Continued)

FOREIGN PATENT DOCUMENTS

| | | |
|---|---|---|
| DE | 102012022453 A1 | 5/2014 |
| DE | 102012022481 A1 | 5/2014 |

(Continued)

OTHER PUBLICATIONS

Search Report and Written Opinion for IT Application No. 201700143710 completed Jul. 10, 2018 (8 pages).

(Continued)

*Primary Examiner* — Tulsidas C Patel
*Assistant Examiner* — Ahmed Elnakib
(74) *Attorney, Agent, or Firm* — Cantor Colburn LLP

(57) ABSTRACT

Stator of an electric machine, wherein the stator has: a magnetic core provided with a plurality of slots; a winding provided with a plurality of bars, each of which has a straight portion inserted inside a respective slot of the magnetic core and two curved sections that are part of two corresponding heads of the winding; and a cooling circuit that is designed to be flown through by a cooling fluid. The cooling circuit has: a plurality of main channels, which are formed inside the magnetic core beside, and radially more on the outside than the slots containing the bars; and a pair of end bodies, each of which is arranged around a corresponding head of the winding and contains a series of joining channels, which are connected to the ends of the main channels.

10 Claims, 12 Drawing Sheets

(51) Int. Cl.
  *H02K 3/12*   (2006.01)
  *H02K 3/38*   (2006.01)

(56) References Cited

U.S. PATENT DOCUMENTS

| | | | |
|---|---|---|---|
| 6,326,709 B1 * | 12/2001 | Adelmann | H02K 9/26 |
| | | | 310/52 |
| 2011/0285221 A1 | 11/2011 | Chamberlin et al. | |
| 2013/0076171 A1 * | 3/2013 | Lepres | H02K 9/19 |
| | | | 310/59 |
| 2014/0265666 A1 * | 9/2014 | Shoykhet | H02K 9/19 |
| | | | 310/59 |
| 2014/0300220 A1 | 10/2014 | Marvin | |

FOREIGN PATENT DOCUMENTS

| | | |
|---|---|---|
| JP | 201659117 A | 4/2016 |
| WO | 9917422 A1 | 4/1999 |
| WO | 2014075752 A2 | 5/2014 |
| WO | 2015040586 A2 | 3/2015 |

OTHER PUBLICATIONS

Search Report issued in European Patent Application No. 18211825.7-1201, dated Jul. 15, 2019 (date of completion, Jul. 8, 2019); 17 pages.
Partial European Search Report issued European Patent Application No. 18211825.7-1201, dated Apr. 24, 2019; 17 pages.

* cited by examiner

STATOR OF AN ELECTRIC MACHINE PROVIDED WITH FLUID COOLING

CROSS-REFERENCE TO RELATED APPLICATIONS

This patent application claims priority from Italian patent application no. 102017000143710 filed on Dec. 13, 2017, the entire disclosure of which is incorporated herein by reference.

TECHNICAL FIELD

The present invention relates to a stator of an electric machine provided with fluid cooling.

PRIOR ART

In road vehicles, the electric drive together with the traditional thermal drive to achieve a hybrid drive is increasingly popular.

The integration of an electric machine in a road vehicle requires an adequate cooling system dedicated to the electric machine to prevent the electric machine from overheating and in particular to avoid that the insulation of the conductors forming the stator winding exceeds the nominal working temperatures (a prolonged exceeding of the nominal working temperatures accelerates the aging of the insulation of the conductors constituting the stator winding and therefore determines an early wear of the electric machine).

The patent application DE 102008049226A1 describes a cooling system of a vehicle electric machine. The cooling system comprises an outer shell that encloses the casing of the electric machine, thus defining around the casing an annular cooling chamber (namely a so-called "water-jacket") flown through by a cooling fluid (typically water).

The patent application EP 2112744A1 describes a cooling system of a vehicle electric machine. The electric machine comprises a cylindrical casing, which is formed by an outer cup-shaped shell and by an inner cup-shaped shell, contains the stator and is inserted in the outer shell to define, together with the outer shell, a cylindrical body closed on both sides. A cooling circuit (namely a so-called "water-jacket") is formed between the outer shell and the inner shell, said circuit developing in a spiral between an inlet opening and an outlet opening, both formed in a side wall of the outer shell.

The creation of a so-called "water-jacket" around the stator does not allow obtaining particularly high thermal performances (in particular, the temperature difference between the cooling fluid and the electrical conductors of the stator is relatively large), because the cooling fluid remains far from the electrical conductors of the stator where most of the heat develops by Joule effect, namely because there is a significant thermal resistance between the stator electrical conductors (i.e. the area where most of the heat develops by Joule effect) and the cooling fluid.

The patent application US 2013076171A1 and the patent application US 2011285221A1 disclose a stator of a rotating electric machine provided with a cooling circuit, which is designed to be flown through by a cooling fluid and has an inlet opening of the cooling fluid and an outlet opening of the cooling fluid. The cooling circuit comprises a plurality of main channels, which are formed inside the magnetic core, beside, and radially more on the outside than the slots containing the conductors, each of them extending from a base wall to the opposite base wall of the magnetic core. Moreover, the cooling circuit comprises a pair of end bodies, each of which rests in a fluid-tight manner against a corresponding base of the magnetic core, is arranged around a corresponding head of the winding and contains a series of joining channels, which are connected to the ends of the main channels leading into the corresponding base of the magnetic core.

DESCRIPTION OF THE INVENTION

The object of the present invention is to provide a stator of an electric machine provided with fluid cooling, which has high thermal performances and, at the same time, is simple and inexpensive to manufacture.

According to the present invention, it is provided a stator of an electric machine provided with fluid cooling, as claimed in the appended claims.

The claims describe preferred embodiments of the present invention forming an integral part of the present disclosure.

BRIEF DESCRIPTION OF THE DRAWINGS

The present invention will now be described with reference to the annexed drawings showing an example of a non-limiting embodiment, in which.

PREFERRED EMBODIMENTS OF THE INVENTION

Figure 1:
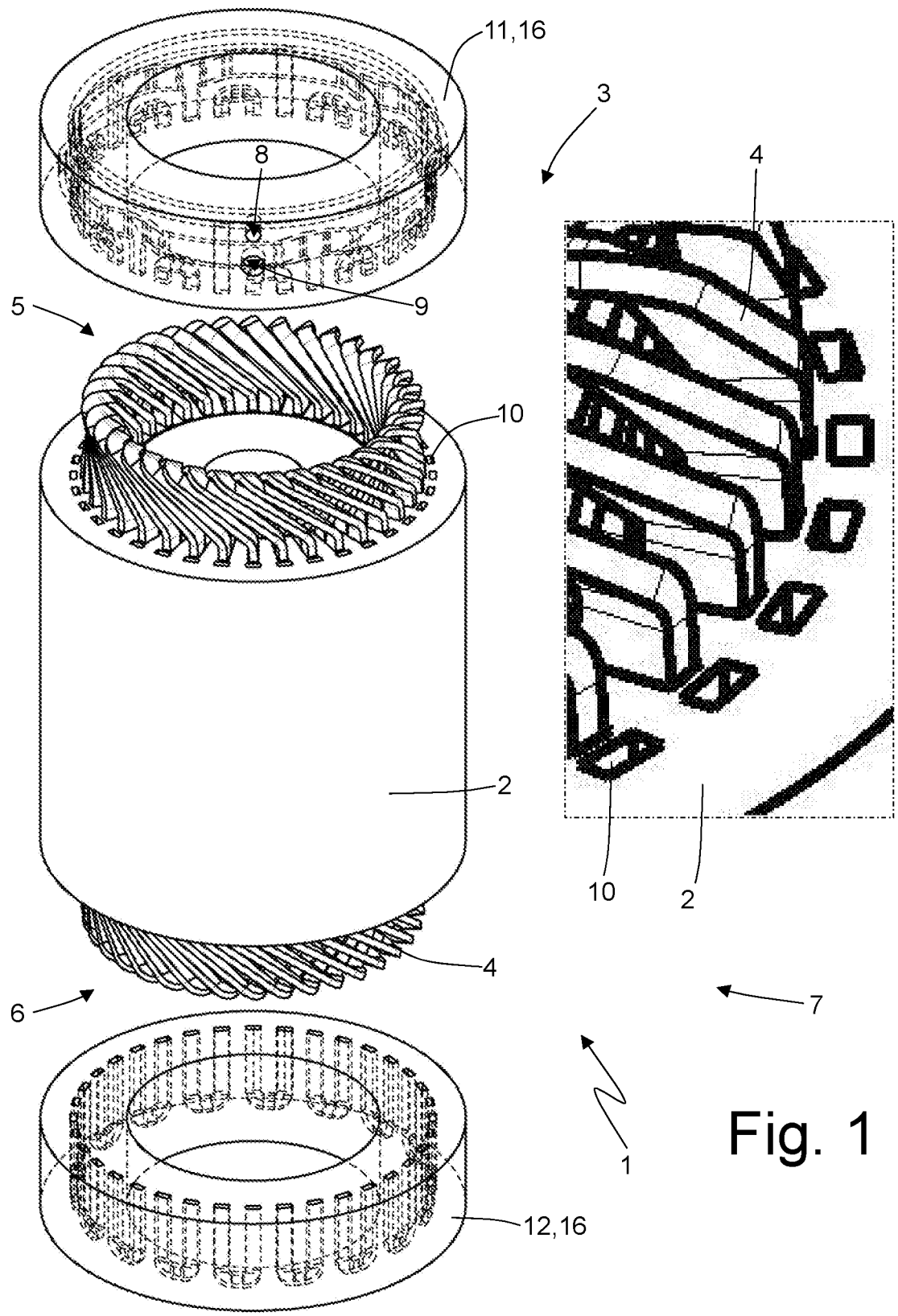
FIG. 1 is a perspective view, exploded and with parts removed for clarity's sake, of a stator of an electric machine made in accordance with the present invention.

In FIG. 1, the number 1 indicates as a whole a stator of a reversible synchronous automotive electric machine (i.e. that can work both as an electric motor by absorbing electrical energy and generating a mechanical driving torque and as an electric generator by absorbing mechanical energy and generating electrical energy). The stator 1 has a cylindrical tubular shape and is arranged around a rotor (not shown) to enclose the rotor. According to other embodiments not shown, the rotor might be arranged externally with respect to stator 1, or the stator 1 might not have a cylindrical shape.

The stator 1 comprises a magnetic core 2, which is formed by a series of pack-tightened sheets and has a cylindrical centrally holed shape (i.e. a tubular shape). The magnetic core 2 has two circular opposite base walls and is longitudinally crossed by a plurality of slots, which are evenly distributed along the inner side of the magnetic core 2, each of them extending from a base wall to the opposite base wall. A three-phase winding 3 is coupled to the magnetic core 2, which comprises a series of rigid bars 4 that are mutually connected to form the electrical paths of the stator winding 3 at the two heads 5 and 6. This means that the bars 4 form the electrical conductors of the stator winding 3. According to other embodiments not shown, the winding could have a number of phases different from three.

Each bar 4 has a straight portion inserted in a respective slot of the magnetic core 2 and two curved portions, which are arranged out of the magnetic core 2, are mutually opposite and are part of the corresponding heads 5 and 6 of the winding 3. In particular, each bar 4 is initially U-shaped and comprises two legs connected by a cusp. The two legs of the same bar 4 form two corresponding conductors of the stator winding 3. The U-shaped bars 4 are inserted through the stator slots, defining an inlet side (at the heads 5) in which the cusps of the U-shaped bars 4 are arranged, and an outlet side (at the heads 6) in which the legs of the U-shaped bars 4 are arranged. The ends of the legs of the U-shaped bars 4 arranged in the outlet side are (differently) bent and are therefore electrically connected by welding to form the electrical paths of the stator winding 3 (and therefore to make up the head 6 of the winding 3).

The stator 1 comprises a cooling circuit 7, which is designed to be flown through by a cooling fluid (typically water, possibly added with anti-freeze additives and/or with anti-corrosion additives) and has an inlet opening 8 of the cooling fluid and an outlet opening 9 of the cooling fluid. The cooling circuit 7 coupled to the stator 1 is part of a cooling system, which further comprises a circulation pump (not shown) and a radiator (not shown, i.e. a water/air heat exchanger). In use, the cooling system circulates the cooling fluid through the cooling circuit 7 coupled to the stator 1 and through the radiator so as to remove heat from the stator 1.

The cooling circuit 7 comprises a plurality of main channels 10, which are formed inside the magnetic core 2 beside, and radially more on the outside than the slots containing the bars 4, each of them extending from a base wall to the opposite base wall. Moreover, the cooling circuit 7 comprises a pair of end bodies 11 and 12, each of which rests in a fluid-tight manner against a corresponding base of the magnetic core 2, is arranged around a corresponding head 5 or 6 of the winding and contains a series of joining channels 13, which are connected to the ends of the main channels 10 leading into the corresponding base of the magnetic core.

Figure 2:
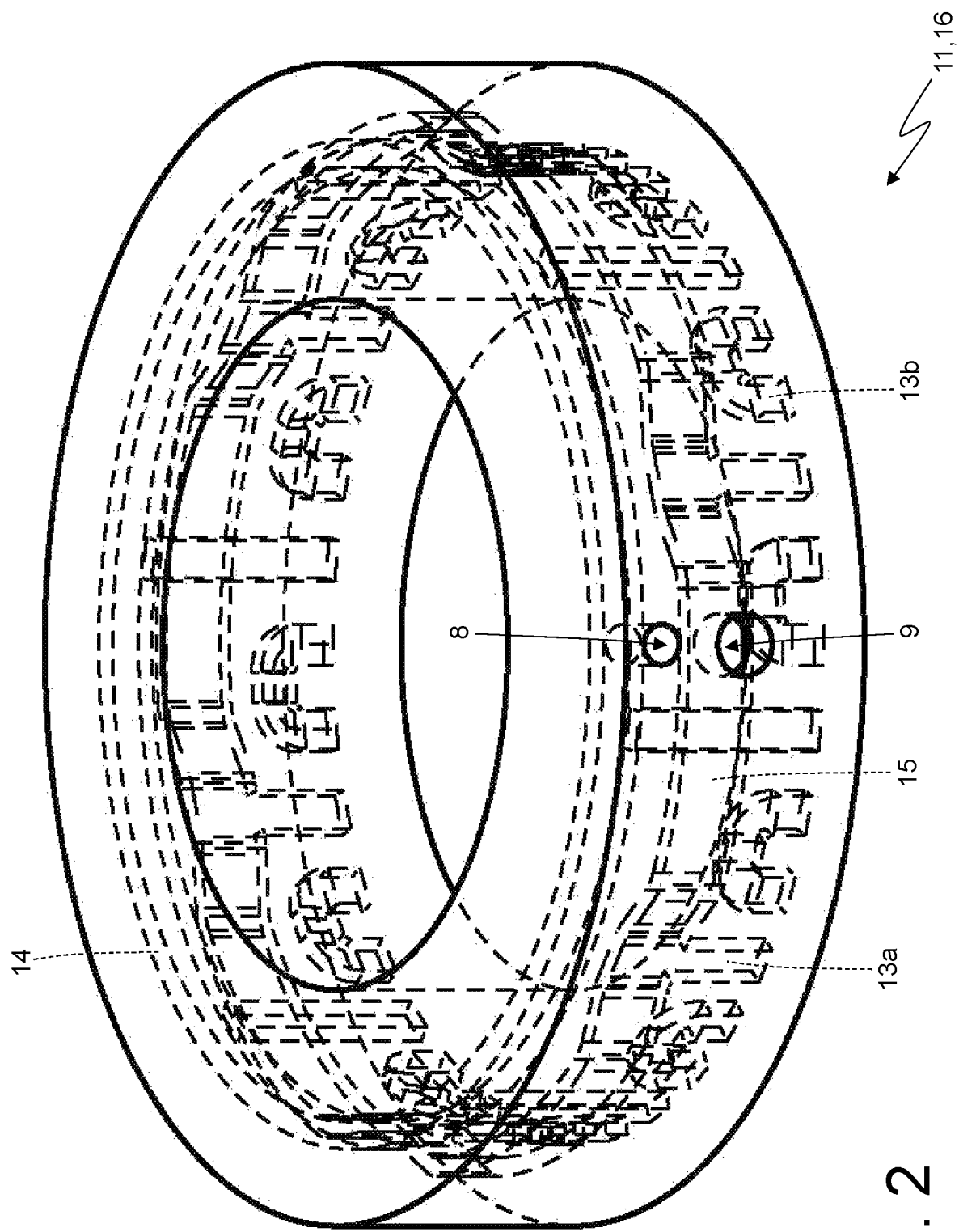
FIGS. 2 and 3 are perspective views of two end bodies of a cooling circuit of the stator of FIG. 1.

According to what better shown in FIG. 2, it is provided an annular manifold 14 that is closed on itself (i.e., extends over 360° with no beginning and no end), is coaxial with the magnetic core 2 and is connected to the inlet opening 8 of the cooling fluid, and an annular manifold 15 that is closed on itself (i.e., extends over 360° with no beginning and no end), is coaxial to the magnetic core 2 and is connected to the outlet opening 9 of the cooling fluid. In the embodiment shown in FIG. 2, both annular manifolds 14 and 15 are formed in the same end body 11 and are axially arranged one on top of the other (namely are axially spaced apart).

Figure 3:
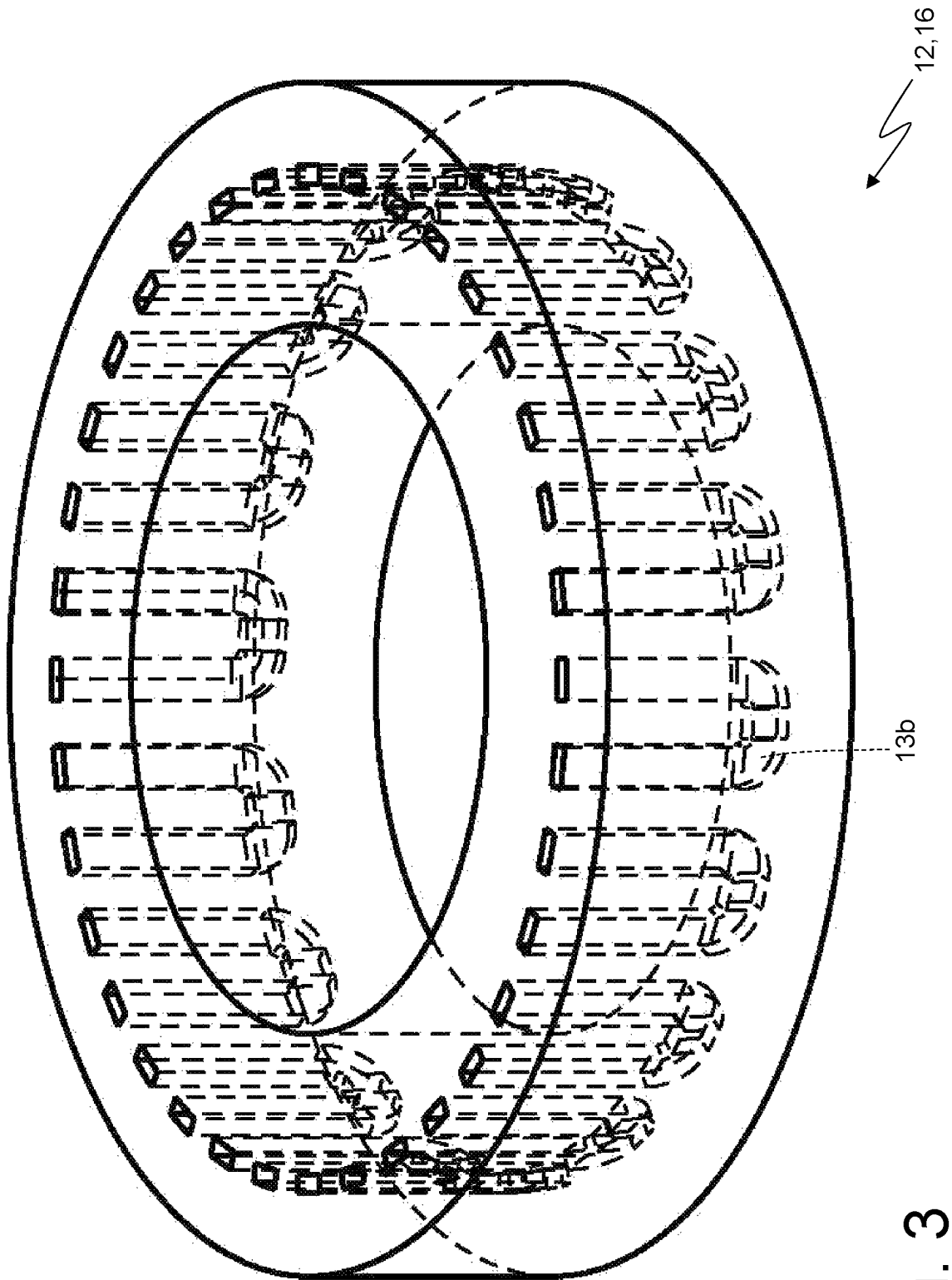
Figure 4:
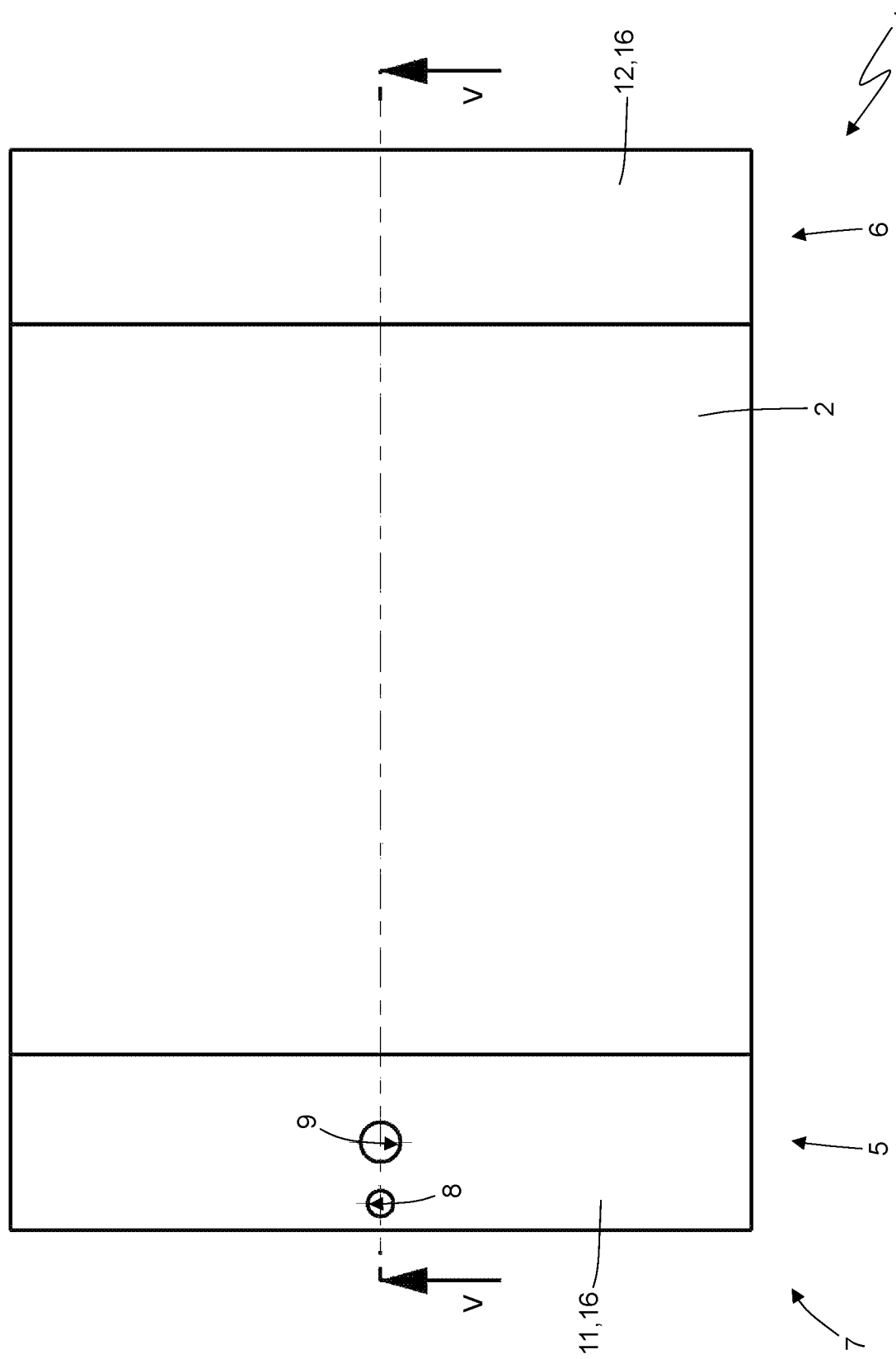
FIG. 4 is a side view of the stator of FIG. 1.
Figure 5:
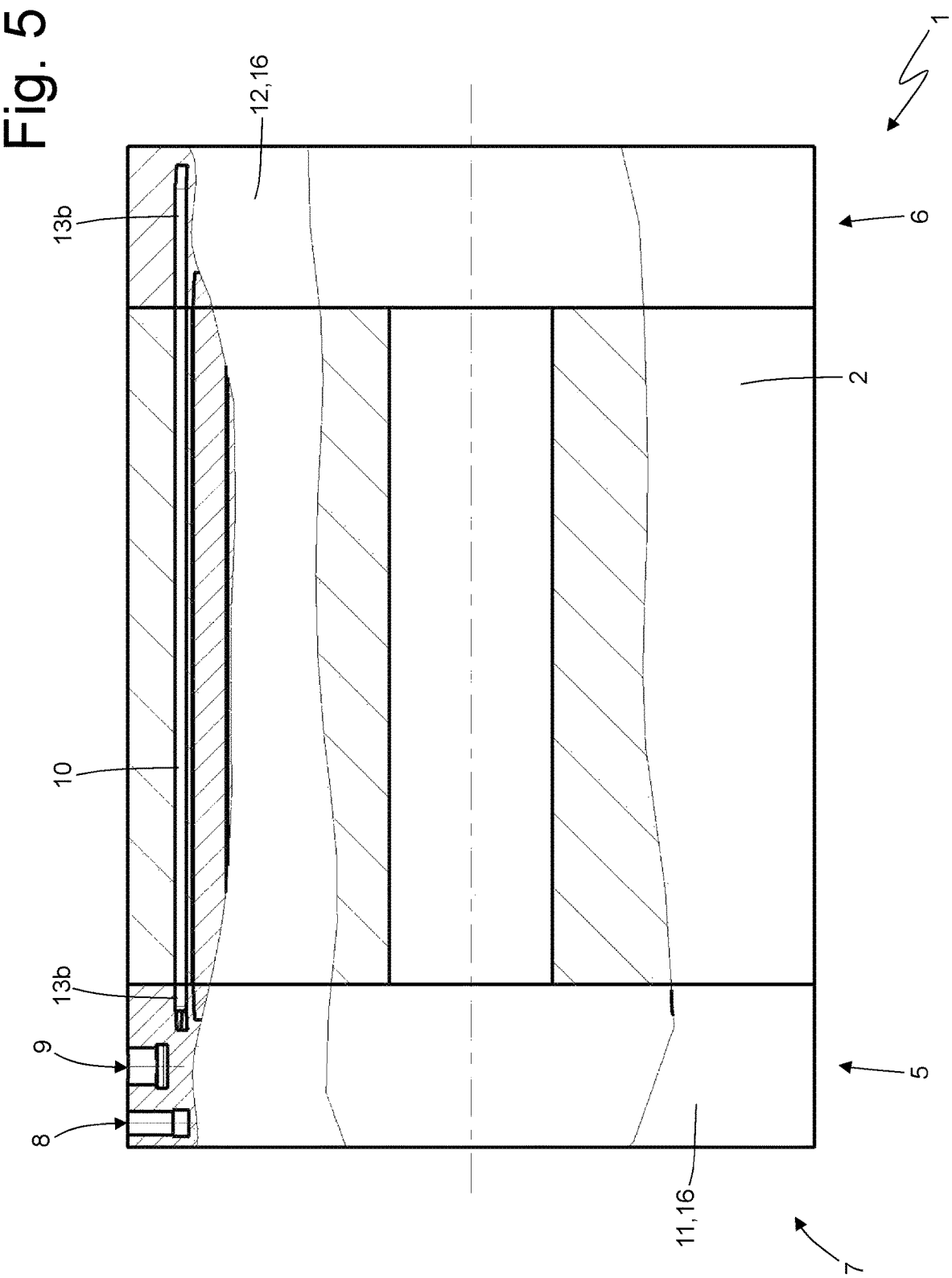
FIG. 5 is a longitudinal section view along the section line V-V of the stator of FIG. 1.
Figure 6:
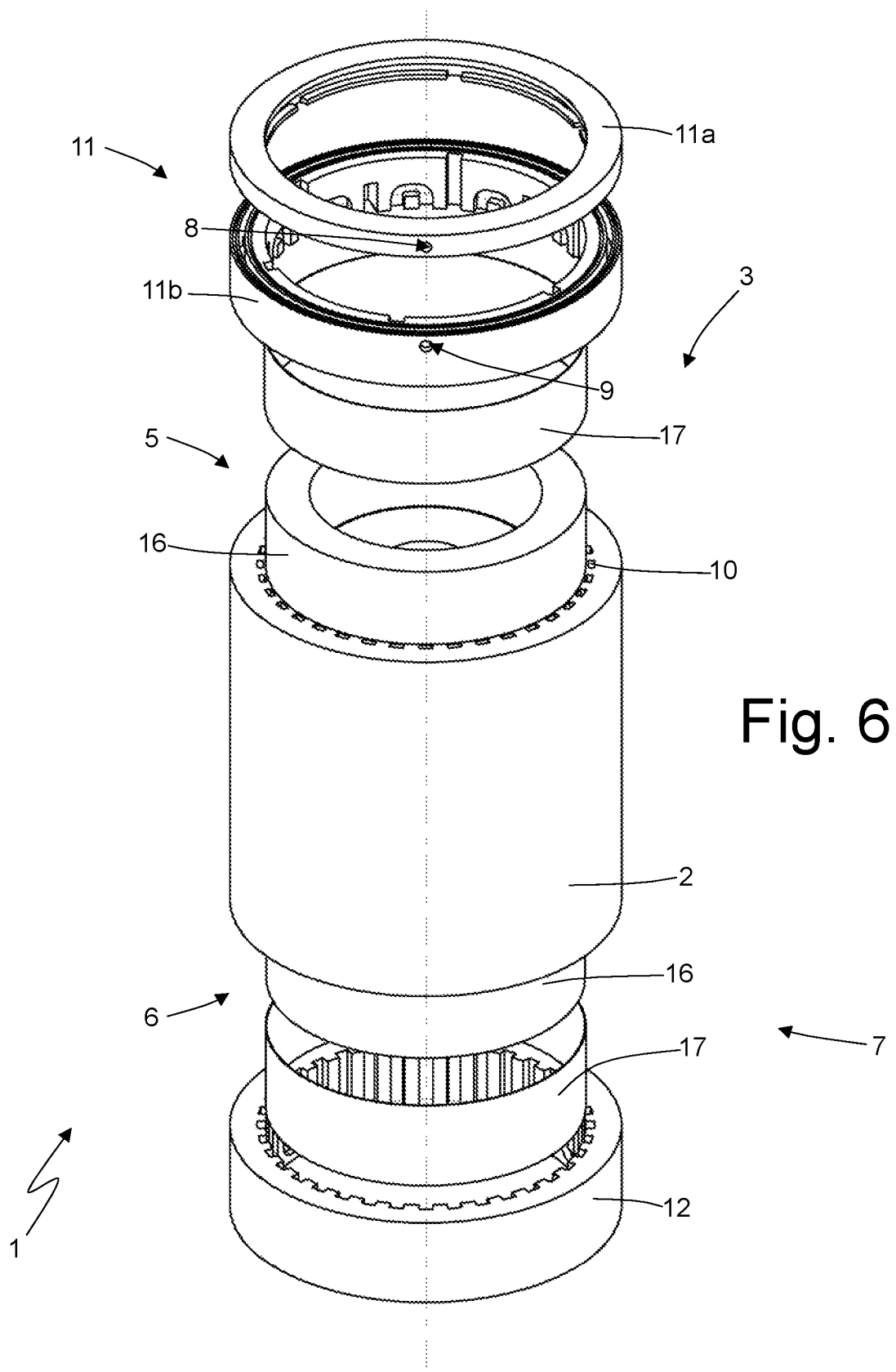
FIG. 6 is a perspective view, exploded and with parts removed for clarity's sake, of an alternative embodiment of the stator of FIG. 1.
Figure 7:
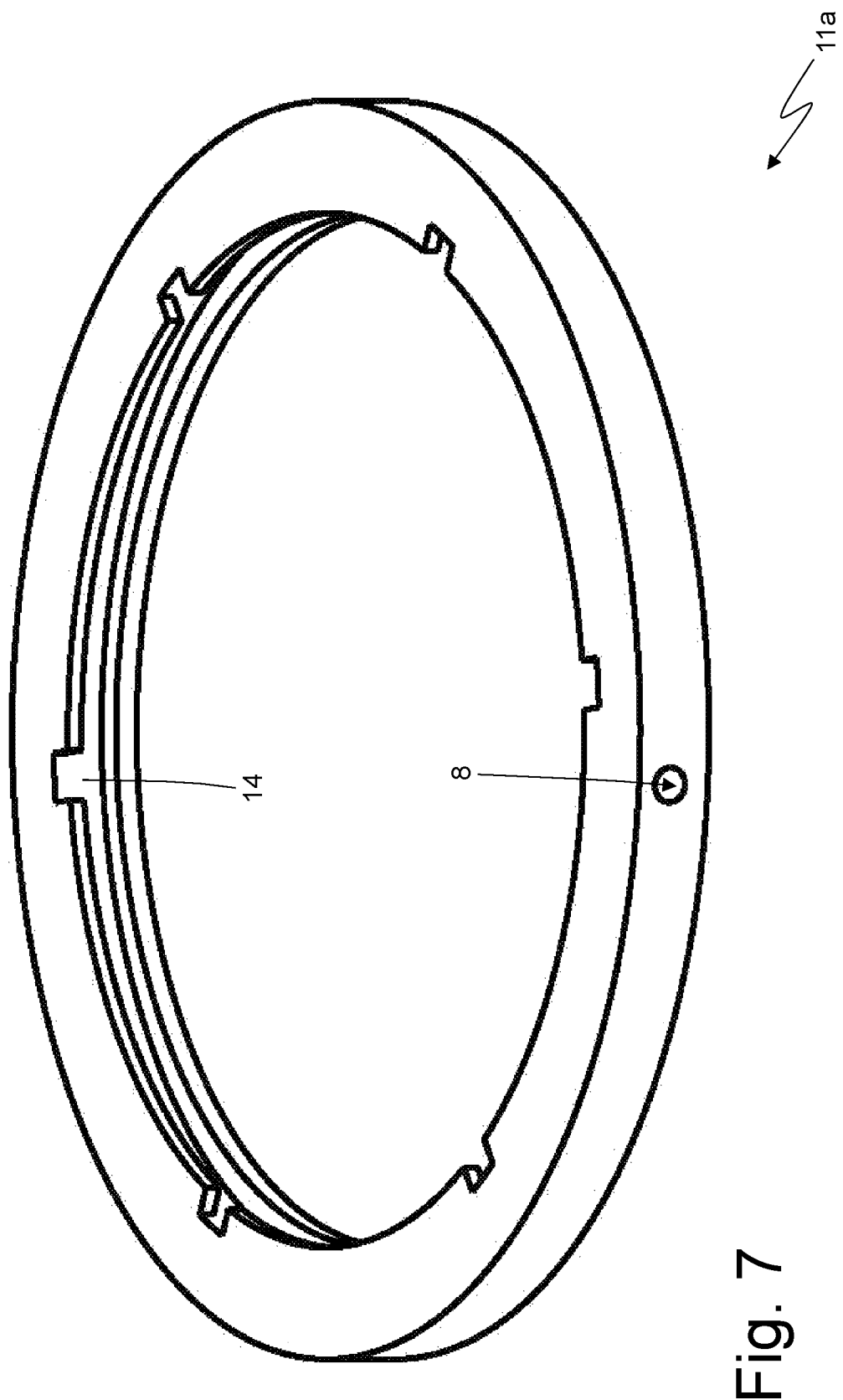
FIGS. 7, 8 and 9 are perspective views of two end bodies of a cooling circuit of the stator of FIG. 6.
Figure 8:
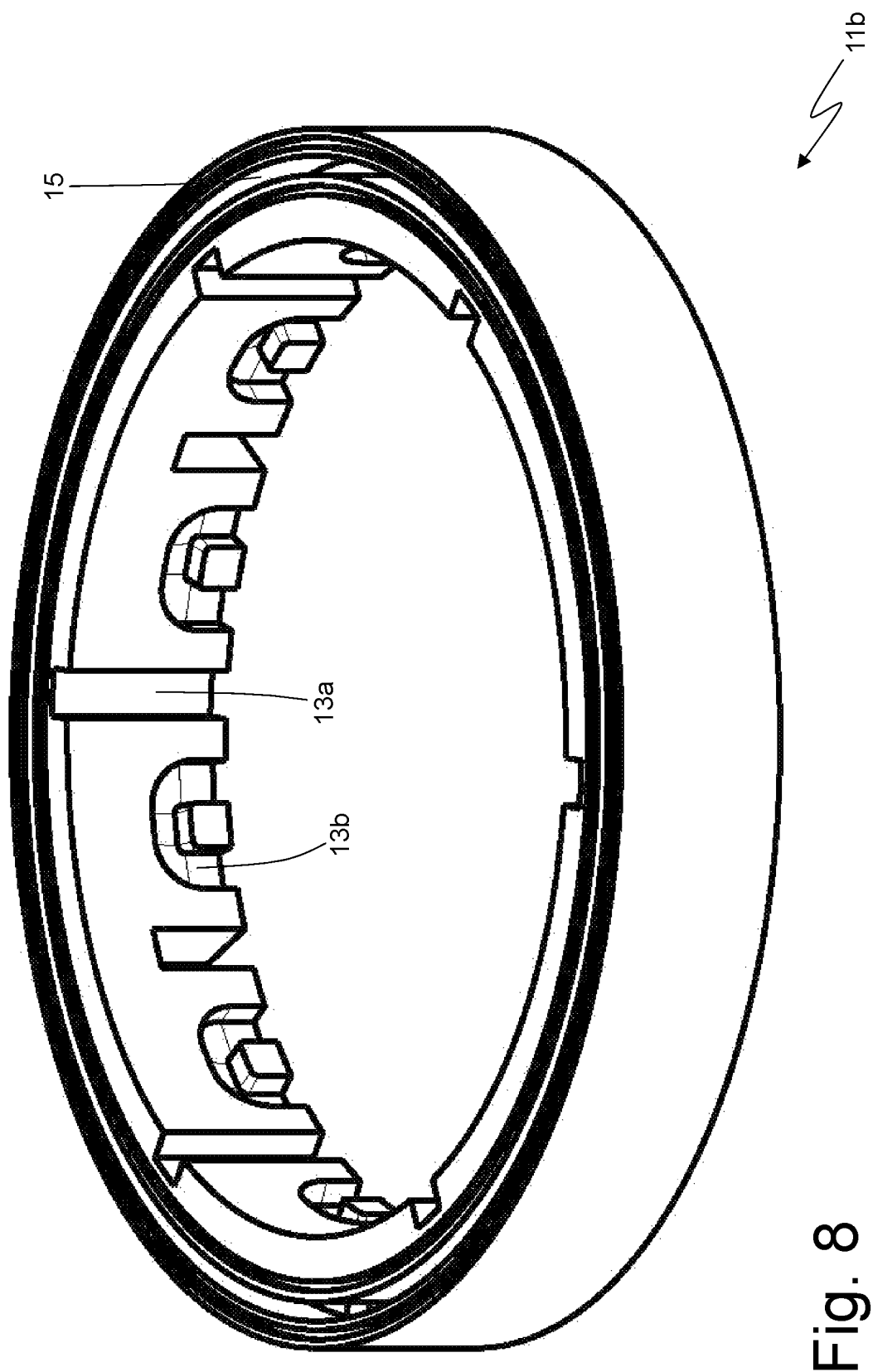
Figure 9:
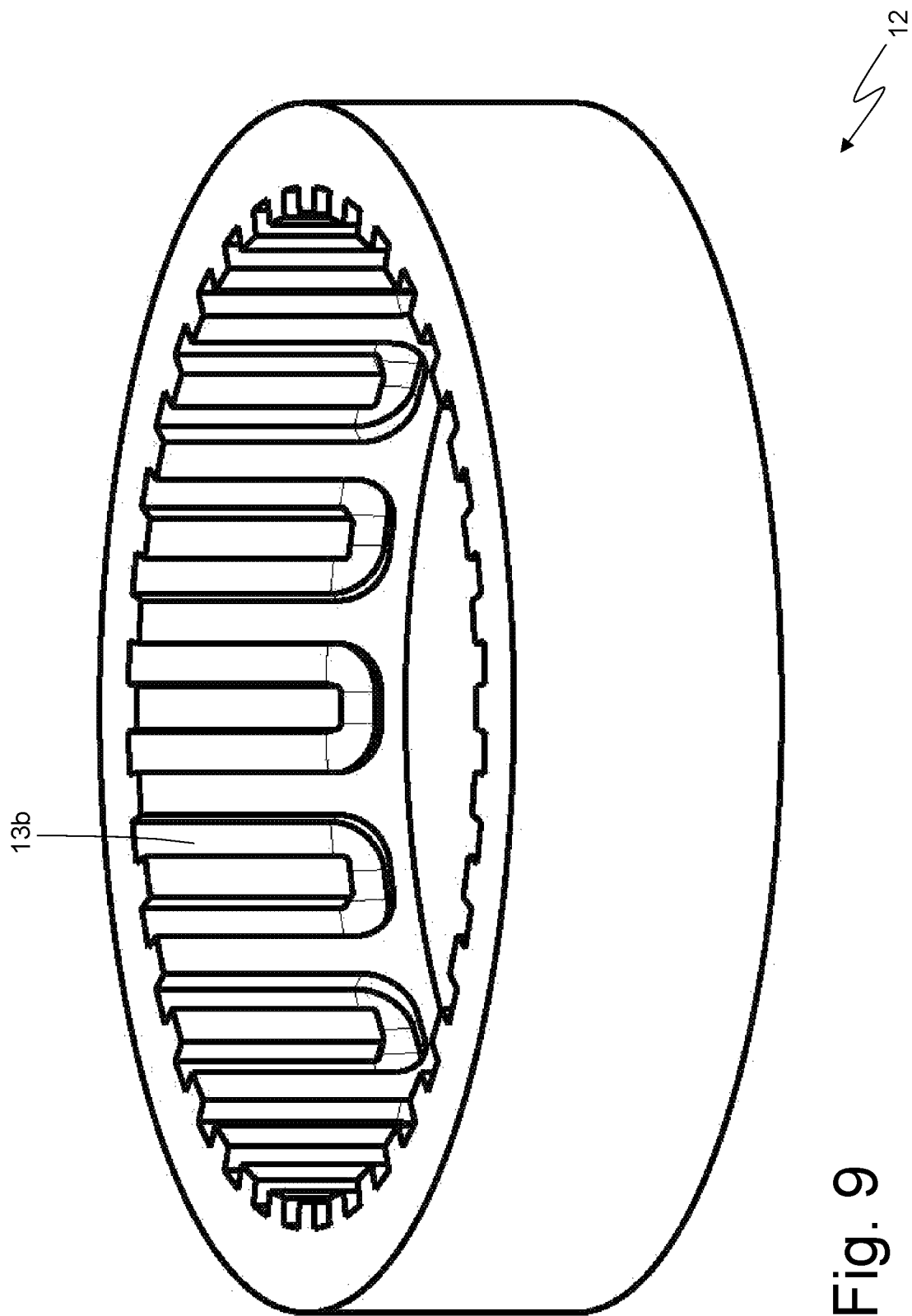
Figure 10:
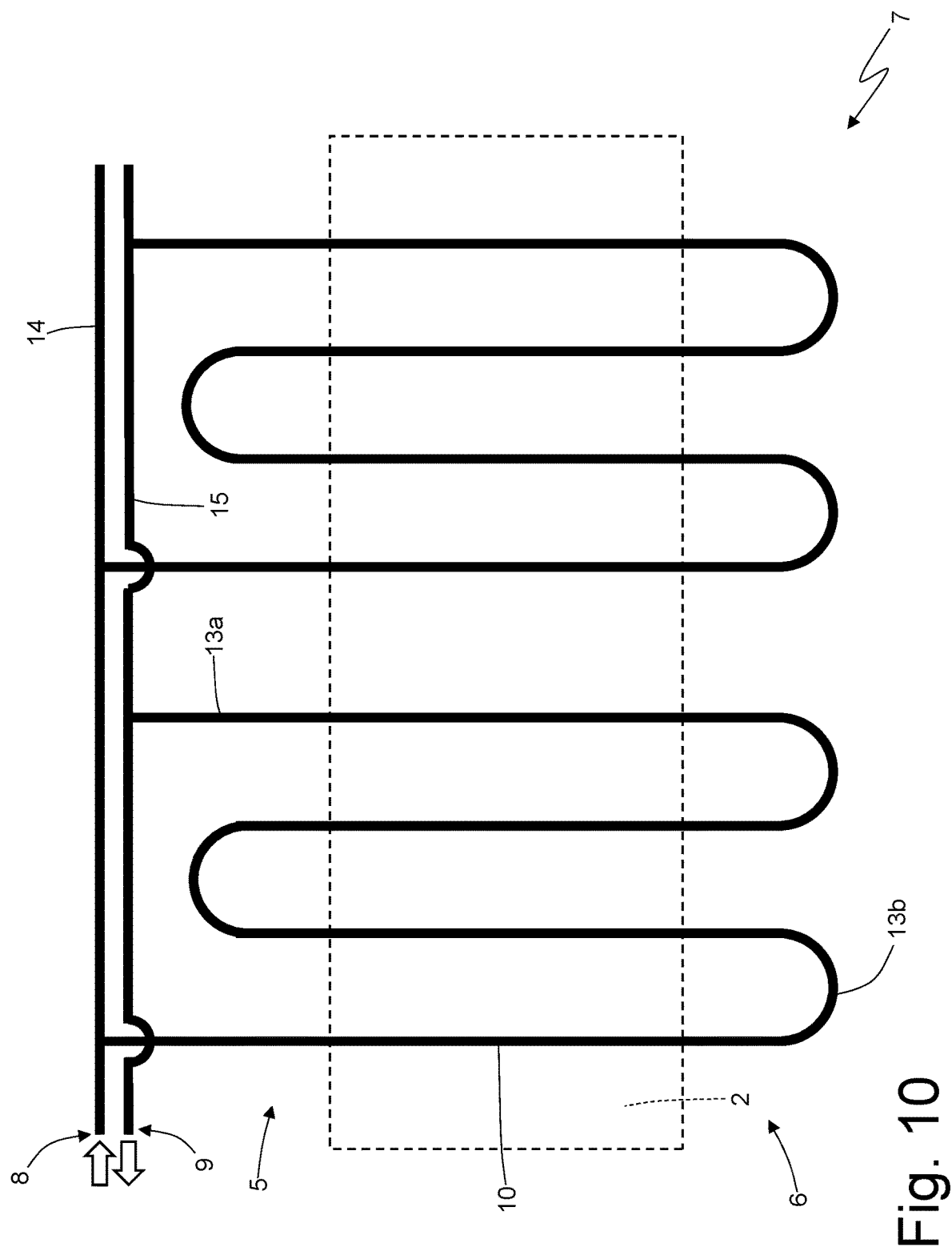
FIG. 10 is a schematic view of the flows of a cooling fluid in the stator of FIG. 1.

According to what better shown in FIGS. 2 and 3, some joining channels 13a are straight, are axially arranged (i.e. are parallel to a central axis of symmetry of the magnetic core 2), and connect annular manifolds 14 and 15 to corresponding main channels 10. On the other hand, other joining channels 13b are U-shaped, are insulated from the annular manifolds 14 and 15 and each of them connects two main channels 10 (i.e. each joining channel 13b connects the ends of two main channels 10). In particular, in the embodiment shown in FIGS. 2 and 3 in which both annular manifolds 14 and 15 are formed in the same end body 11, the end body 11 has straight joining channels 13a and U-shaped joining channels 13b, whereas the end body 12 only has U-shaped joining channels 13b (i.e. all joining channels 13b formed in the end body 12 are U-shaped and each of them connects two main channels 10).

The stator 1 comprises two crowns 16 (also called "pottings") made of plastic material (in particular of thermosetting and waterproof resin), each of which encloses a corresponding head 5 or 6 of the winding 3. In other words, each crown 16 is a resin coating that covers and encloses a corresponding head 5 or 6 of the winding 3 to form an electrical insulation and an insulation against the atmospheric agents of the head 5 or 6 of the winding 3 Preferably and as far as possible, the crowns 16 are made of a plastic material that is electrically insulating and thermally conductive.

In the embodiment shown in FIGS. 1-5, the two end bodies 11 and 12 are formed by the two crowns 16 containing the joining channels 13. In other words, the two end bodies 11 and 12 are integrated in the two crowns 16 and therefore coincide with the two crowns 16. In the embodiment shown in FIGS. 1-5, the joining channels 13 and the annular manifolds 14 and 15 can be formed in the end bodies 11 and 12 by curing the resin constituting the crowns 16 in a mould provided with disposable cores (e.g. made of wax). Among other things, the disposable cores prevent the plastic material constituting the crowns 16 from penetrating into the main channels 10, thus plugging the main channels 10.

According to a different embodiment shown in FIGS. 6-9, each end body 11 or 12 is separated from the corresponding crown 16 and is arranged around (namely radially outwardly) the crown 16. In particular, the end body 12 is composed of a single indivisible piece, whereas the end body 11 is composed of two pieces 11a and 11b (shown in FIGS. 7 and 8), initially distinct and then joined to one another.

According to other embodiments not shown and perfectly equivalent, the end bodies 11 and 12 could be manufactured in different ways. For example, the end bodies 11 and 12 could both be formed by two semi-cylinders that are connected to each other (e.g. by means of screws) to make their assembly on the magnetic core 2 easier. According to a preferred embodiment, an annular insulating sheet 17 (preferably, but not necessarily made of a ceramic material) is arranged between each end body 11 or 12 and the corresponding crown 16. As far as possible, the insulating sheet 17 should be made of an electrically insulating and thermally conductive material.

According to the embodiment shown in FIGS. 6-9, the joining channels 13 and/or the annular manifolds 14 and 15 are formed on an inner surface of the end bodies 11 and 12 (namely the joining channels 13 and/or the annular manifolds 14 and 15 are open towards the inside of the end bodies 11 and 12). Moreover, each insulating sheet 17 is connected in a fluid-tight manner to the corresponding end body 11 or 12 and constitutes an inner wall of the joining channels 13 and/or of the annular manifolds 14 and 15 of the corresponding end body 11 or 12. According to an alternative embodiment not shown, the joining channels 13 and/or the annular manifolds 14 and 15 are formed inside the end bodies 11 and 12 and therefore each insulating sheet 17 simply rests (without any fluid-tight connection) against the corresponding end body 11 or 12; in this embodiment, insulating sheets 17 may also be absent.

In the embodiment shown in FIGS. 6-9, the end bodies 11 and 12 can be made of a metal material (e.g. aluminium) or of a plastic material.

In the embodiment shown in FIGS. 6-9, the joining channels 13 and the annular manifolds 14 and 15 can be formed in the end bodies 11 and 12 by casting in a mould provided with disposable cores and/or by mechanical machining with chip removal.

In the embodiment shown in FIGS. 1-10, both annular manifolds 14 and 15 are formed in the same end body 11.

This solution allows obtaining an optimal temperature distribution, but on the other hand has a more complicated manufacturing (since the two annular manifolds 14 and 15 must be very close together).

Figure 11:
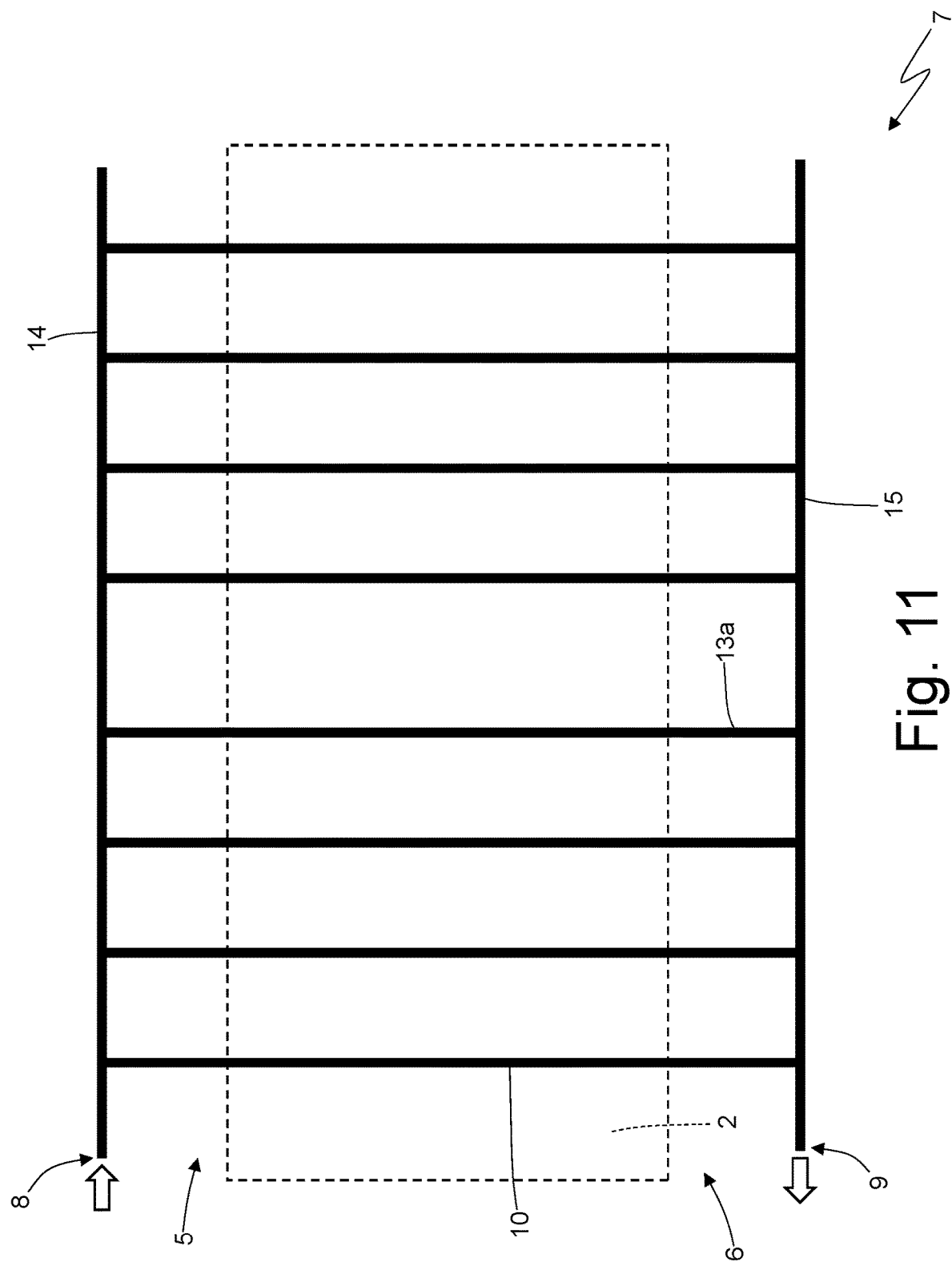
FIGS. 11 and 12 are two schematic views of the flows of the cooling fluid in respective variants of the stator of FIG. 1.
Figure 12:
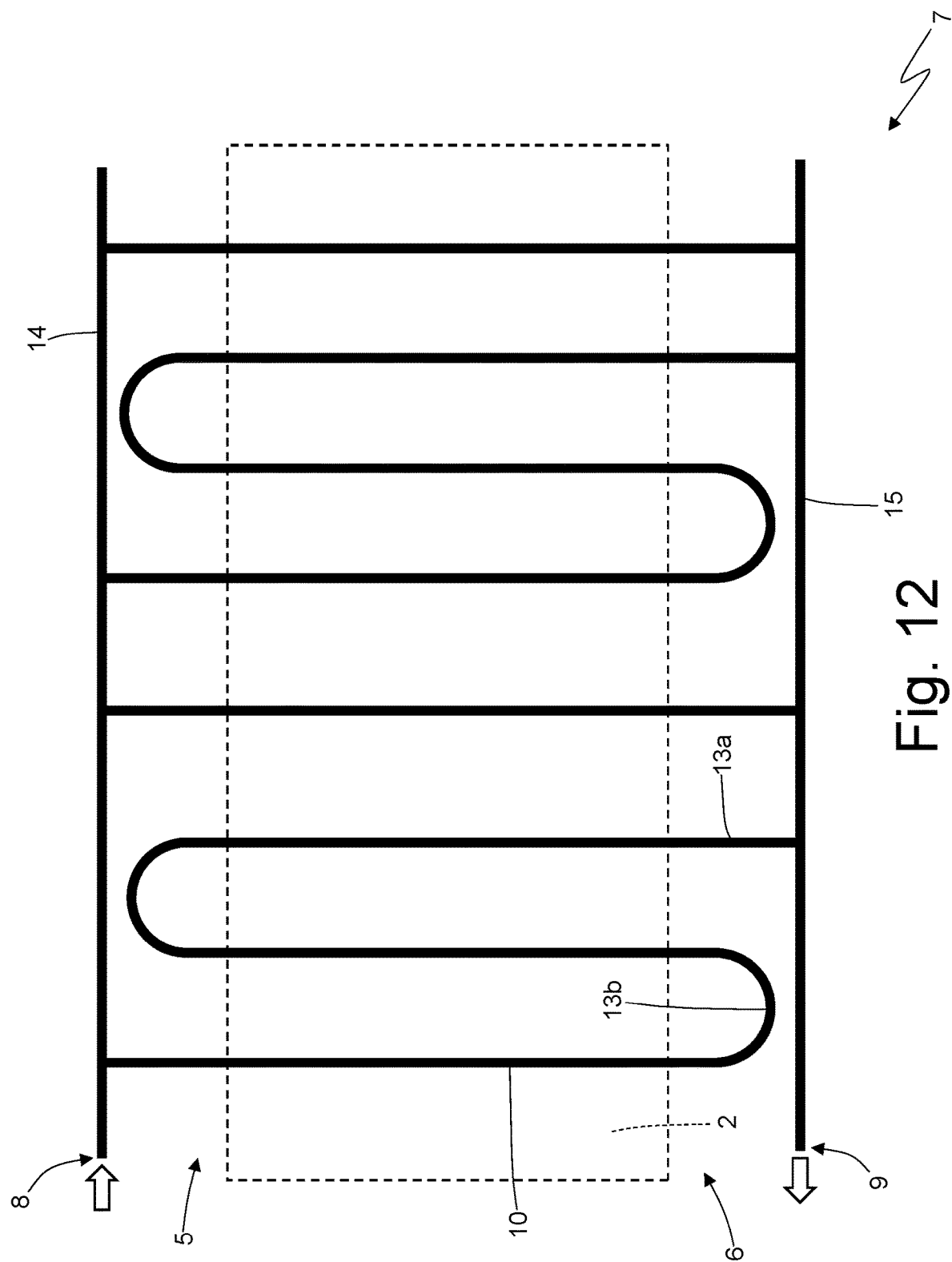

In the alternative embodiment shown in FIGS. 11 and 12, the annular manifold 14 is formed in the end body 11 and the annular manifold 15 is formed in the end body 12 opposite the end body 11. This solution is of simpler realization, but on the other hand it does not allow obtaining an optimal temperature distribution. In this case and as shown in FIG. 11, all joining channels 13 are straight, are axially arranged and connect annular manifolds 14 and 15 to corresponding main channels 10.

Alternatively and as shown in FIG. 12, some joining channels 13a are straight, are axially arranged and connect the annular manifolds 14 and 15 to corresponding main channels 10, whereas other joining channels 13b are U-shaped, are insulated from the annular manifolds 14 and 15 and each of them connects two main channels 10 (i.e. each joining channel 13b connects the ends of two main channels 10).

According to a possible embodiment, the main channels 10 may be provided in advance with an impermeable coating to prevent the cooling fluid flowing in the main channels 10 from creeping between the sheets of the magnetic core 2 until they reach the bars 4 (i.e. the live conductors in which the electric current flows). In other words, the function of the impermeable coating of the main channels 10 is to guarantee a clear separation between the cooling fluid and the bars 4 (i.e. the conductors under tension in which the electric current flows). This impermeable coating can be applied to the main channels 10 by painting the main channels 10 using an impermeable varnish or enamel. In other words, the main channels 10 formed in the sheets of the magnetic core 2 are sealed to each other and made impermeable by using special sealing varnishes/enamels, which can be applied by spraying or by immersion. This prevents the cooling fluid from creeping between one sheet and the other until reaching the bars 4 (namely, the live conductors in which the electric current flows).

In the embodiment shown in the accompanying figures, the winding 3 of the stator 1 is formed by rigid bars 4, i.e. it is a "bar winding". According to a different embodiment, not shown and perfectly equivalent, the winding 3 of the stator 1 is made by a round wire that is wound in coils inserted in the slots of the stator, i.e. it is a "wire winding".

The embodiments described herein can be combined without departing from the scope of protection of the present invention.

The aforementioned stator 1 has several advantages.

First, the aforementioned stator 1 provides an extremely efficient cooling, namely it provides particularly high thermal performances, since it allows minimizing the thermal resistance (and consequently the temperature difference) between the cooling fluid and the electrical conductors (namely the bars 4 of the winding 3) of the stator 1 and since it guarantees a very high amount of disposed heat per unit of volume of circulated cooling fluid. These results are obtained thanks to the fact that the main channels 10 in which the cooling fluid flows are very close to the bars 4 in which the greatest part of the heat is generated by Joule effect and are directly formed in the magnetic core 2, thus allowing a maximum thermal exchange with the magnetic core 2 (i.e. the heat is removed directly where it is generated without having to wait for any heat transmission to elements outside the magnetic core 2). Moreover, these results are obtained thanks to the fact that the joining channels 13 and the annular manifolds 14 and 15 in which the cooling fluid flows are very close to the heads 5 and 6 of the winding 3, thus allowing a removal of the heat very close to the heads 5 and 6. In other words, the cooling is integrated into the magnetic core 2 of the stator 1 and is therefore very close (as close as possible) to the electrical conductors (namely to the bars of the winding 3) of the stator 1 and this allows a better efficiency and a better continuous power.

Please note that in the stator 1 described above, also the heat generated (essentially by the Joule effect of the parasitic currents) directly inside the sheets making up the magnetic core 2 is removed in an extremely effective and efficient manner. In fact, the cooling fluid flowing in the main channels 10 is substantially in direct contact with the sheets making up the magnetic core 2.

Moreover, the stator 1 described above is easy and inexpensive to manufacture, since the making of the main channels 10 inside the magnetic core 2 can be very simply achieved during the shearing of the sheets making up the magnetic core 2 and since the making of the end bodies 11 and 12 can be very simply achieved by means of disposable cores (end bodies 11 and 12 integrated in the crowns 16 as shown in FIGS. 1-5) or by trivial mechanical machining of annular elements (end bodies 11 and 12 separated by crowns 16 as shown in FIGS. 6-9).

LIST OF REFERENCE NUMBERS OF THE FIGS 1 stator
2 magnetic core
3 stator winding
4 slot
5 head
6 head
7 cooling circuit
8 inlet opening
9 outlet opening
10 main channels
11 end body
12 end body
13 joining channels
14 annular manifold
15 annular manifold
16 crowns
17 insulating sheet

The invention claimed is:
1. A stator (1) of an electric machine comprising:
a magnetic core (2), which has two opposite base walls and is provided with a plurality of slots, each of them extending from a base wall to the opposite base wall, the magnetic core including a first end and a second end;
a winding (3), which is provided with a plurality of conductors, each having a straight segment, which is inserted in a respective slot of the magnetic core (2), and two curved segments, which are arranged on the outside of the magnetic core (2), are opposite one another and are part of two respective heads (5, 6) of the winding (3); and a cooling circuit (7), which is designed to be flown through by a cooling fluid and has a single inlet opening (8) of the cooling fluid and a single outlet opening (9) of the cooling fluid within a first end body;

wherein the cooling circuit (7) comprises a plurality of main channels (10), which are formed inside the magnetic core (2) in proximity to the slots, and radially more on the outside than the slots containing the conductors, each of them extending from a base wall to the opposite base wall;

wherein the cooling circuit (7) comprises the first end body at the first end of the magnetic core and second end body at the second end of the magnetic core each resting against the magnetic core (2) in a fluid-tight manner, being arranged around a corresponding head (5, 6) of the winding (3) and containing a series of joining channels (13), which are connected to the ends of the main channels (10) leading into the corresponding base of the magnetic core (2);

wherein the cooling circuit (7) comprises a first annular manifold (14), which is closed on itself, is arranged coaxially within the first end body of the magnetic core (2) and is connected to the inlet opening (8) of the cooling fluid, and a second annular manifold (15), which is closed on itself, is arranged coaxially within the first end body of the magnetic core (2) and is connected to the outlet opening (9) of the cooling fluid; and wherein the joining channels in the first end body are alternatingly straight and u-shaped, wherein some of the straight channels are fluidly connected to the first annular manifold and the other straight channels are fluidly connected to the second annular manifold, wherein the joining channels in the second body are u-shaped, and wherein the annular manifolds, joining channels and main channels are configured to provide a continuous fluid pathway from the inlet opening of the first annular manifold to the outlet opening of the second annular manifold.

2. A stator (1) according to claim 1, further comprising first and second crowns (16) made of a plastic material, each enclosing a corresponding head (5, 6) of the winding (3); and the two end bodies (11, 12) are formed by the two crowns (16) inside which the joining channels (13) are formed.

3. A stator (1) according to claim 1, further comprising first and second crowns (16) made of a plastic material enclosing a corresponding head (5, 6) of the winding (3); wherein the first and second end bodies are separate from the corresponding crown (16) and are arranged around the crown (16).

4. A stator (1) according to claim 3, wherein an annular insulating sheet (17) is interposed between each end body (11, 12) and the corresponding crown (16).

5. A stator (1) according to claim 4, wherein the insulating sheet (17) is made of a ceramic material.

6. A stator (1) according to claim 4, wherein the joining channels (13) are formed on an inner surface of the end bodies (11, 12); and each insulating sheet (17) is connected to the corresponding end body (11, 12) in a fluid-tight manner and makes up an inner wall of the joining channels (13) of the corresponding end body (11, 12).

7. A stator (1) according to claim 1, wherein the straight joining channels (13a) in the first end body are axially arranged and connect the annular manifolds (14, 15) to corresponding main channels (10).

8. A stator (1) according to claim 1, wherein the u-shaped joining channels (13b) in the first end body are insulated from the annular manifolds (14, 15) and each of them connects two main channels (10).

9. A stator (1) according to claim 1, wherein the u-shaped joining channels (13b) formed in the second body (12) are U-shaped and each of them connects two main channels (10).

10. A stator (1) according to claim 1, wherein each main channel (10) is provided with an impermeable coating.

* * * * *